Sept. 28, 1965 D. A. SPAULDING 3,209,274
ELECTRONICALLY TUNABLE TRANSISTOR INTERSTAGE NETWORK
Filed Jan. 17, 1963
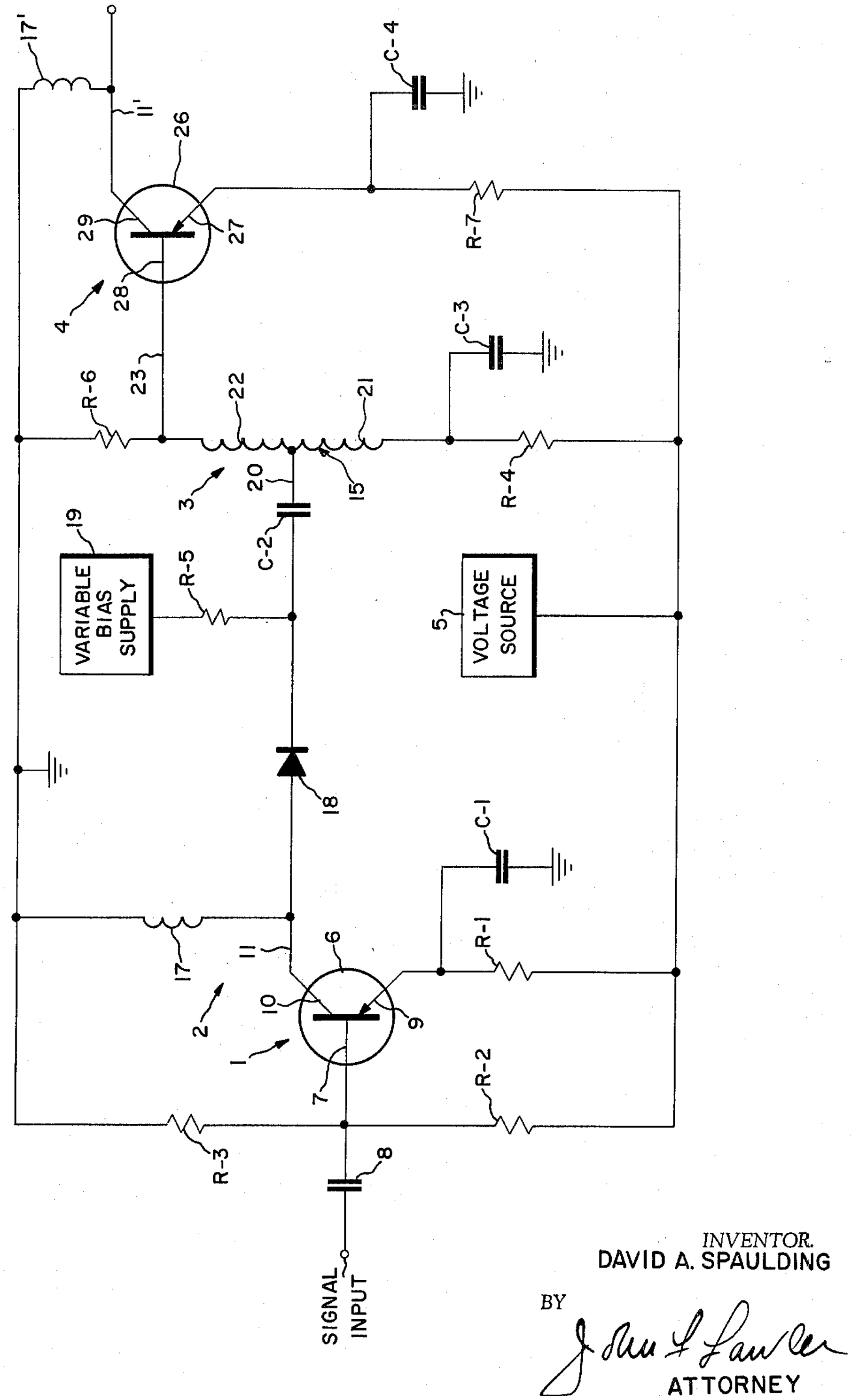
INVENTOR.
DAVID A. SPAULDING
BY [signature]
ATTORNEY

3,209,274
ELECTRONICALLY TUNABLE TRANSISTOR INTERSTAGE NETWORK

David A. Spaulding, Palo Alto, Calif., assignor to Sylvania Electric Products Inc., a corporation of Delaware Filed Jan. 17, 1963, Ser. No. 252,250
1 Claim. (Cl. 330—21)

This invenion relates to radio frequency (RF) networks and more particularly to an electronically tunable transistor interstage network.

A desirable feature in a search receiver is a frequency selective network that operates in and is electronically tunable over a broad band of RF frequencies. One practical means of achieving such frequency selectivity is a tuned circuit in the network coupling the stages of the RF amplifier.

One well-known practice of the prior art for realizing such a tunable amplifier is to shunt the characteristically large output impedance of a first amplifier with a parallel-tuned tapped coil interstage network. The tap on the coil is electrically connected to the input of a second amplifier having a characteristically low input impedance. The deleterious features, representative of this and other methods of the prior art, that preclude its use are that: the circuit Q is not sufficiently high to provide adequate selectivity, the circuit Q decreases and the bandwidth increases as the center frequency is increased, the circuit does not compensate for the significant roll-off in the transistor short circuit current gain (6 db/octave), and the tuning range is reduced as a result of the loading by the characteristically low input impedance of the second transistor amplifier.

This invention overcomes the problems by (1) transforming the low input impedance of the second amplifier into the shunt tuned circuit such that it is electrically in series with a reactive element thereof and (2) reducing the low input impedance of the second amplifier to reduce its loading effect on the tuned circuit. In accordance with this invention, a shunt tuned circuit is electrically connected between the output of a first amplifier and a reference potential. Impedance transformation means is electrically connected across the input of a second amplifier and to the tuned circuit such that the low input impedance of the second amplifier is reduced and transformed into the tuned circuit in electrical series with a reactive component thereof.

An object of this invention is the provision of a narrowband interstage network having a relatively constant instantaneous narrow bandwidth and being electronically tunable over an octave bandwidth for frequencies greater than 100 mc.

Another object is the provision of transistor amplifiers and a tunable interstage network having relatively constant gain and bandwidth over a broad band of frequencies.

Still another object is the provision of an interstage network whose effective circuit Q is proportional to frequency so as to maintain a constant bandwidth and to compensate for the roll-off in transistor current gain.

This invention and the aforementioned and others of its objects will be more fully understood from the following detailed description of a preferred embodiment illustrated in the accompanying circuit diagram of first and second amplifiers electrically connected by an interstage coupling network.

The illustrated network comprises a first amplifier 1, a shunt tuned circuit 2, impedance transformation circuit 3 and a second amplifier 4. The first amplifier 1 comprises a transistor 6 having a base 7 to which an input signal may be applied through coupling capacitor 8, an emitter 9 electrically connected through a bias resistor R–1 to a positive voltage source 5 and through a by-pass capacitor C–1 to a reference potential such as A.C. ground, and a collector 10 electrically connected to a reference potential such as D.C. ground. A bias potential is developed on base 7 by current flow through bias resistors R–2 and R–3, electrically connected between the positive voltage source 5 and base 7 and between base 7 and ground, respectively. The output of amplifier 1 is applied to tuned circuit 2 through line 11.

Tuned circuit 2 electrically connects the output of the first amplifier 1 to impedance transformation circuit 3 preferably comprising tapped transformer 15. Tuned circuit 2 comprises an inductor 17 electrically connected between line 11 and D.C. ground; a varactor diode 18 electrically connected in series with line 11 and, through a by-pass capacitor C–2, the tap 20 of transformer 15; a winding 21 of transformer 15 electrically connected through bias resistor R–4 to the positive voltage source 5 and through by-pass capacitor C–3 to A.C. ground; and a bias resistor R–5 electrically connected between the diode 18 and a source of bias potential 19. Varactor diode 18 provides the capacitance of tuned circuit 2 in the preferred embodiment of the invention. Although a mechanical capacitor may be substituted for the varactor diode-capacitor 18, the capacitor is preferably electrically variable to permit electrical adjustment of the resonant frequency of the tuned circuit.

Tapped transformer 15 is preferably a broadband bifilar transformer wound on a ferrite toroid. The transformer essentially operates as a length of transmission line and has greater coupling, lower loss and less leakage inductance (making it possible to operate at higher frequencies) than conventional core wound transformers. The transformer operates satisfactorily at frequencies where the length of the winding is much less than a quarter wavelength, conservatively from approximately 1 mc. to 500 mc. Transformer 15 has a second winding 22 electrically connected through bias resistor R–6 to D.C. ground.

The second amplifier 4 comprises transistor 26 having an emitter 27, base 28 and collector 29. Emitter 27 is electrically connected through bias resistor R–7 to the positive voltage source 5 and through by-pass capacitor C–4 to A.C. ground. Collector 29 is electrically connected through an inductance 17′ to ground. Base 28 is connected by line 23 to transformer winding 22. The output of the circuit is applied to the next stage through line 11′.

An incident signal applied to base 7 of transistor 6 is amplified by the first amplifier 1. The amplified output is applied to tuned circuit 2 by line 11. The tuned circuit 2, when the A.C. circuit equivalent is considered, is essentially a parallel resonant circuit having a predetermined resonant frequency and resonance characteristic and passes incident signals, whose frequencies are in a band determined by the resonance characteristic and circuit Q, to transformer 15 and finally to the second amplifier 4.

If the first and second amplifiers were electrically connected without employing the transformers as described herein, the ratio of the square root of the effective output resistance of amplifier 1 to the effective input resistance of amplifier 4 would be an indication of the quality factor or Q of the circuit. Stated differently, the resistive component of the input impedance of amplifier 4 would load the tuned circuit and lower its Q. As this ratio is low, the resultant Q of the tuned circuit coupled to these impedances would also be low.

In accordance with this invention, the loading effect of the input impedance of the second amplifier 4 is reduced by the impedance transformation circuit 3 which couples the input impedance of amplifier 4 into tuned circuit 2 and transforms it to a lower value. The transformer 15 essentially steps down the already low input impedance : amplifier 4 to an even lower value that has negligible ading effect on the tuned circuit when it is electrically ansformed into the circuit. Specifically, this step-down ansformation in the illustrated embodiment changes the put resistance $R_{in}$ and input capacitance $C_{in}$ of transtor 26, measured between base 28 and A.C. ground, to e parallel combination of $$\frac{R_{in}}{n^2}$$

id $n^2C_{in}$, respectively, in the tuned circuit and elecically in series between capacitor 18 and A.C. ground, here $n$ is the turns ratio of transformer 15. The restance and capacitance of the series equivalent of the irallel combination of $$\frac{R_{in}}{n^2}$$

id $n^2C_{in}$ are determined to be approximately $$R=\frac{\frac{R_{in}}{n^2}}{1+\omega^2R_{in}C_{in}^2} \quad (1)$$

$$\approx\frac{1}{\omega^2n^2R_{in}C_{in}^2} \quad (2)$$

$$C=\frac{1+\omega^2R_{in}^2C_{in}^2}{\omega^2C_{in}\frac{R_{in}}{n^2}} \quad (3)$$

$$\approx n^2C_{in} \quad (4)$$

here $\omega$ is $2\pi f_0$ and $f_0$ is the resonant frequency of the ned circuit. The following assumption is made in dermining Equations 2 and 4, respectively: that $\omega R_{in}C_{in}$ is uch greater than one.

The resonant frequency of the tuned circuit is primarily termined by inductor 17 and the capacitance of varactor ode 18 and may be varied electrically over a broad band frequencies by varying the bias potential applied to the ode-capacitor. The tuned circuit 2 is essentially a freiency selective network and, when the circuit is at sonance, is also an impedance matching network. More irticularly, when the circuit is resonant, the inductance ' and capacitance 18 appear as a large impedance, having sentially transformed the low input impedance of the cond amplifier 4 to a large impedance, across the outit of the first amplifier 1, thus matching the low input ipedance of the second amplifier 4 to the high output ipedance of the first amplifier 1.

Considering the series circuit equivalent of tuned circuit its Q is $$Q=\frac{\omega L}{R} \quad (5)$$

iere $\omega$L is the inductive reactance of the circuit and R essentially the resistance shown in Equation 2. It is en from Equation 2 that the transformed resistance is versely proportional to approximately the square of the quency. Thus, it is determined from Equation 5 that e Q of tuned circuit 2 increases with frequency and is oportional to approximately the cube of the frequency. iis circuit characteristic compensates for the roll-off of insistor current gain with increasing frequency, other sses in the circuit (such as the loss in inductor 17, winding 19 and varactor diode 18, and the decrease in the capacitance of the varactor diode with increase in frequency) causing the resultant circuit Q to be approximately proportional to frequency for providing a frequency selective amplifier circuit having relatively constant gain over a broadband of RF frequencies.

The bandwidth B of the tuned circuit is $$B=\frac{f_0}{Q} \quad (6)$$

where $f_0$ is the resonant frequency. As the resultant Q of the tuned circuit is approximately proportional to the frequency, the bandwidth or resonance characteristic of the tuned circuit is approximately constant as it is tuned over a broad band of RF frequencies.

An interstage network embodying this invention, which was constructed and successfully operated, employed two broadband bifilar transformers 15 wound on ferrite toroids, each having a 1:2 turns ratio, resulted in a transistor amplifier and tunable interstage network having the following representative characteristics: a relatively constant (±0.5 db per stage over an octave) center frequency gain of 7 db per stage and an overall instantaneous bandwidth of 4 mc. tunable over greater than a 2:1 center frequency ratio from 120 mc. to 310 mc.

What is claimed is:

A tuned interstage coupling network connected between the output of a first transistor amplifier having a predetermined output impedance and the input of a second transistor amplifier having an input impedance substantially lower than said output impedance comprising

- a transformer having a winding with first and second outer terminals and an intermediate tap,
- means for electrically connecting the first terminal of said transformer to an A.C. reference potential comprising a first by-pass capacitor,
- means for electrically connecting the second terminal of the transformer to the input of the second amplifier, and
- a tunable resonant circuit comprising
  - an inductor having one terminal electrically connected to said A.C. reference potential and the other terminal connected directly to the output of the first amplifier,
  - a varactor diode having one terminal directly connected to the output of the first amplifier and having a second terminal,
  - means for connecting the second terminal of said diode to the intermediate tap of said transformer comprising a second by-pass capacitor, and
  - a variable voltage source having an output connected to said second terminal of the diode between the latter and the second by-pass capacitor for varying the bias and changing the reactance of said diode.

References Cited by the Examiner

UNITED STATES PATENTS

| | | | |
|---|---|---|---|
| 2,244,022 | 6/41 | Rust et al. | 330—165 X |
| 2,576,329 | 11/51 | Bell | 330—167 |

ROY LAKE, *Primary Examiner.*

NATHAN KAUFMAN, *Examiner.*